Oct. 4, 1932.                L. J. DUGAS                1,880,244
                  SPRAYING DEVICE FOR POWDERED MATERIAL
                          Filed Oct. 8, 1928
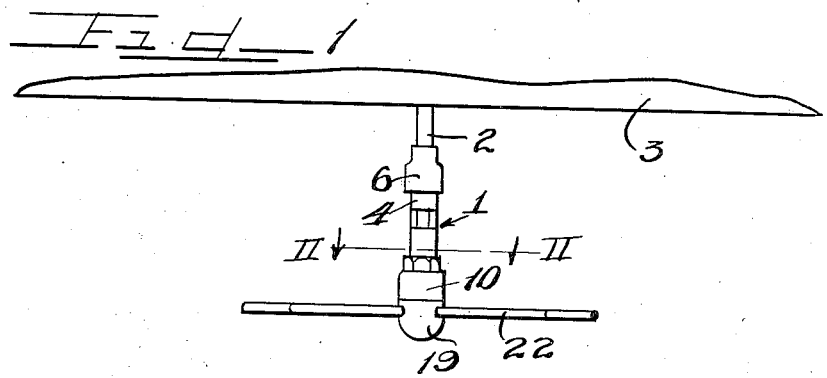
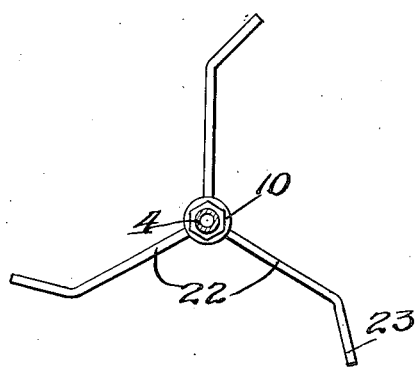
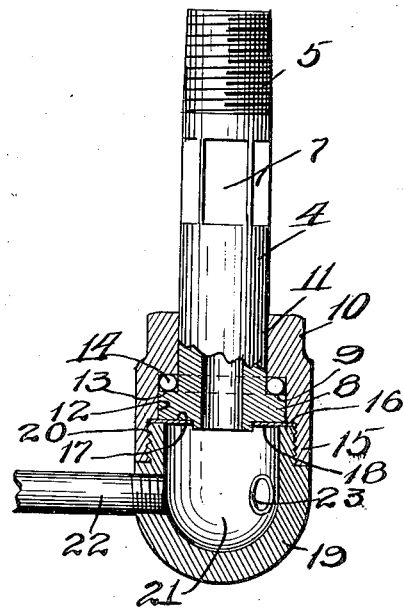
Inventor
Lodias J. Dugas
by Charles Suffel
       Attys.

Patented Oct. 4, 1932

1,880,244

UNITED STATES PATENT OFFICE

LODIAS J. DUGAS, OF CHICAGO, ILLINOIS, ASSIGNOR TO DU-GAS FIRE EXTINGUISHER CORPORATION, OF CHICAGO, ILLINOIS, A CORPORATION OF DELAWARE

SPRAYING DEVICE FOR POWDERED MATERIAL

Application filed October 8, 1928. Serial No. 311,172.

This invention relates to a spraying device for powdered material, and more particularly to a device for spraying powdered fire extinguishing material in connection with a stationary system as installed in buildings, factories and the like.

It is an object of this invention to provide a device for spraying powdered material that will not become clogged by the powdered material getting between the bearing surfaces of the device.

Other and further important objects of this invention will become apparent from the following description and appended claims.

On the drawing:

Figure 1 is an elevational view showing one of the devices embodying this invention;

Figure 2 is a sectional view taken on line II—II of Figure 1; and

Figure 3 is an enlarged longitudinal sectional view of the spraying head with parts in elevation.

The reference numeral 1 indicates as a whole a spray device embodying the principles of this invention, and adapted to be mounted upon a pipe 2 extending downwardly from a ceiling 3 or other surface. This spraying device 1 comprises a tubular member 4 having an upper threaded end 5 adapted to be connected by means of a union 6 to the piping 2. Said tubular member 4 is provided with flattened faces 7 to facilitate the engagement of the said tubular member by a wrench or the like.

The lower end of said tubular member 4 is formed with an enlarged cylindrical portion 8 providing an annular shoulder 9. A bushing 10 is adapted to be swivelly mounted upon the end of said tubular member 4 and for this purpose is provided with an opening 11 for receiving the tubular member 4 and a recess 12 into which said cylindrical portion 8 is adapted to partially extend. There is thus provided an annular space 13 between the bottom of the recess 12 and the annular shoulder 9. Anti-friction bearings 14 are adapted to be positioned in said space 13 for facilitating the easy swivel movement of said bushing 10 about said tubular member 4.

Said bushing 10 is also provided with an open internally threaded end 15, a shoulder 16 being formed at the bottom of said threaded portion. Said shoulder 16 is adapted to lie flush with the flat face 17 of said cylindrical portion 8. A flat disc washer 18 is adapted to be positioned against the face 17 and to extend beyond the periphery of the cylindrical portion 8 to lie against the shoulder 16.

The washer 18 thus substantially encloses the space 13 in which are mounted the anti-friction bearings 14. A hollow spray head 19 is adapted to be threaded into the open internally threaded end 15 of the bushing 10. In this position the end of the spray head 19 abuts against the disc washer 17 as at 20, thus further protecting and sealing the anti-friction bearing race 13.

Said spray head 19 forms a chamber 21 into which are threaded radially extending tubular arms 22, there being provided threaded apertures 23 extending through the wall of said spray head 19. Said tubular spray arms 22 are provided with bent offset ends 23. These offset ends 23 may lie in the same plane as the main portion of the tubular arms 22 or may be slightly downwardly directed.

In operation the powdered fire extinguishing material suspended in a carrying gas, such as nitrogen, is forced under considerable pressure through the tubular member 4 into the hollow chamber 21 from which the gas and powder is discharged through the tubular arms 22. The reaction forces set up by the issuing streams of gas and powder cause the tubular spray arms 22 and spray head 19 to revolve rapidly upon the swivel mounting provided by the bushing 10, anti-friction bearings 14 and tubular member 4.

The effect is to spray a cloud of the fire extinguishing powder in the form of an umbrella that will completely surround and enclose the burning material and cut off the supply of oxygen.

It will be understood that a plurality of spraying devices may be arranged at spaced points throughout a room or buildings in much the same way as the usual sprinkler systems now in use. The important feature of this invention lies in the construction of a spraying device, wherein the bearing surfaces and more particularly the anti-friction bearing chamber are completely enclosed and protected against the intrusion of particles of the powdered fire extinguishing material. In these spraying devices, there is no danger of the powdered material penetrating between the bearing surfaces to clog the device and prevent it from freely rotating upon its swivel mounting.

I am aware that many changes may be made and numerous details of construction may be varied through a wide range without departing from the principles of this invention, and I, therefore, do not purpose limiting the patent granted hereon otherwise then necessitated by the prior art.

I claim as my invention:

1. A device for spraying powdered material, comprising a hollow tubular member having an enlarged cylindrical portion forming an annular shoulder, a recessed bushing adapted to be swivelly mounted upon said tubular member with said shoulder spaced from the bottom of said recess, anti-friction bearings positioned in said space, a flat disc washer positioned upon the end of said tubular member extending beyond the periphery of said cylindrical portion and a hollow apertured head secured to said bushing and abutting said washer.

2. A device for spraying powdered material, comprising a hollow tubular member having an enlarged cylindrical portion forming an annular shoulder, a recessed bushing having an open internally threaded end adapted to be swivelly mounted upon said tubular member with said shoulder spaced from the bottom of said recess, anti-friction bearings positioned in said space, a flat disc washer positioned upon the end of said tubular member extending beyond the periphery of said cylindrical portion and a hollow apertured head threaded into the open end of said bushing and abutting said washer.

3. A device for spraying powdered material, comprising a hollow tubular member having an enlarged cylindrical portion forming an annular shoulder, a recessed bushing adapted to be swivelly mounted upon said tubular member with said shoulder spaced from the bottom of said recess, anti-friction bearings positioned in said space, a flat disc washer positioned upon the end of said tubular member extending beyond the periphery of said cylindrical portion and a hollow apertured head secured to said bushing and abutting said washer, and radially extending tubes having offset ends secured in said apertured head.

4. A device for spraying powdered material, comprising a hollow tubular member having an enlarged cylindrical portion forming an annular shoulder, a bushing containing two counterbores swivelly mounted upon said tubular members with said shoulder spaced from the bottom of the smaller counterbore, anti-friction bearings positioned in said space, a flat disc washer positioned upon the end of said tubular member and extending beyond the periphery thereof, overlying the surface between the first and second counterbores, and a hollow apertured head secured to said bushing and abutting said washer.

5. A device for spraying powdered material, comprising a hollow tubular member having an enlarged cylindrical portion forming an annular shoulder, a bushing containing two counterbores swivelly mounted upon said tubular members with said shoulders spaced from the bottom of the smaller counterbore, anti-friction bearings positioned in said space, a flat disc washer positioned upon the end of said tubular member and extending beyond the periphery thereof, overlying the surface between the first and second counterbores, and a hollow apertured head secured to said bushing and abutting said washer, and radially extending tubes having offset ends secured in said apertured head.

In testimony whereof I have hereunto subscribed my name at Chicago, Cook county, Illinois.

LODIAS J. DUGAS.